United States Patent Office 3,718,521
Patented Feb. 27, 1973

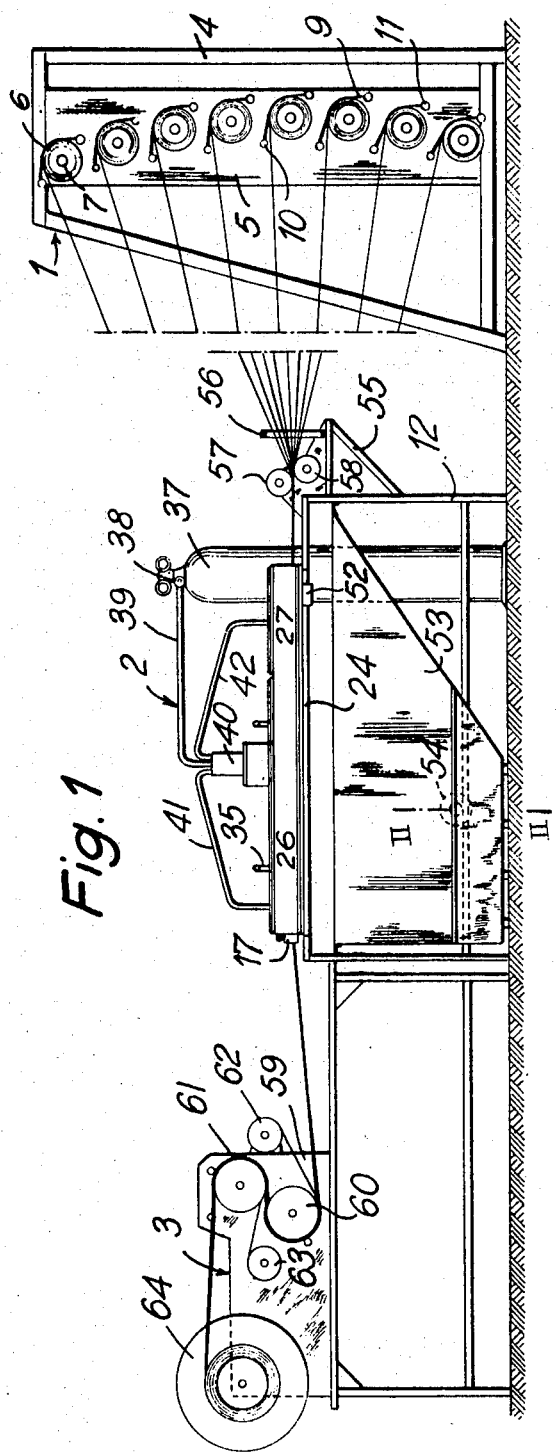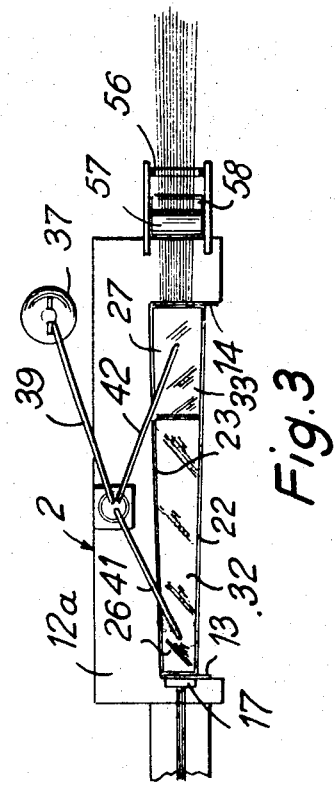

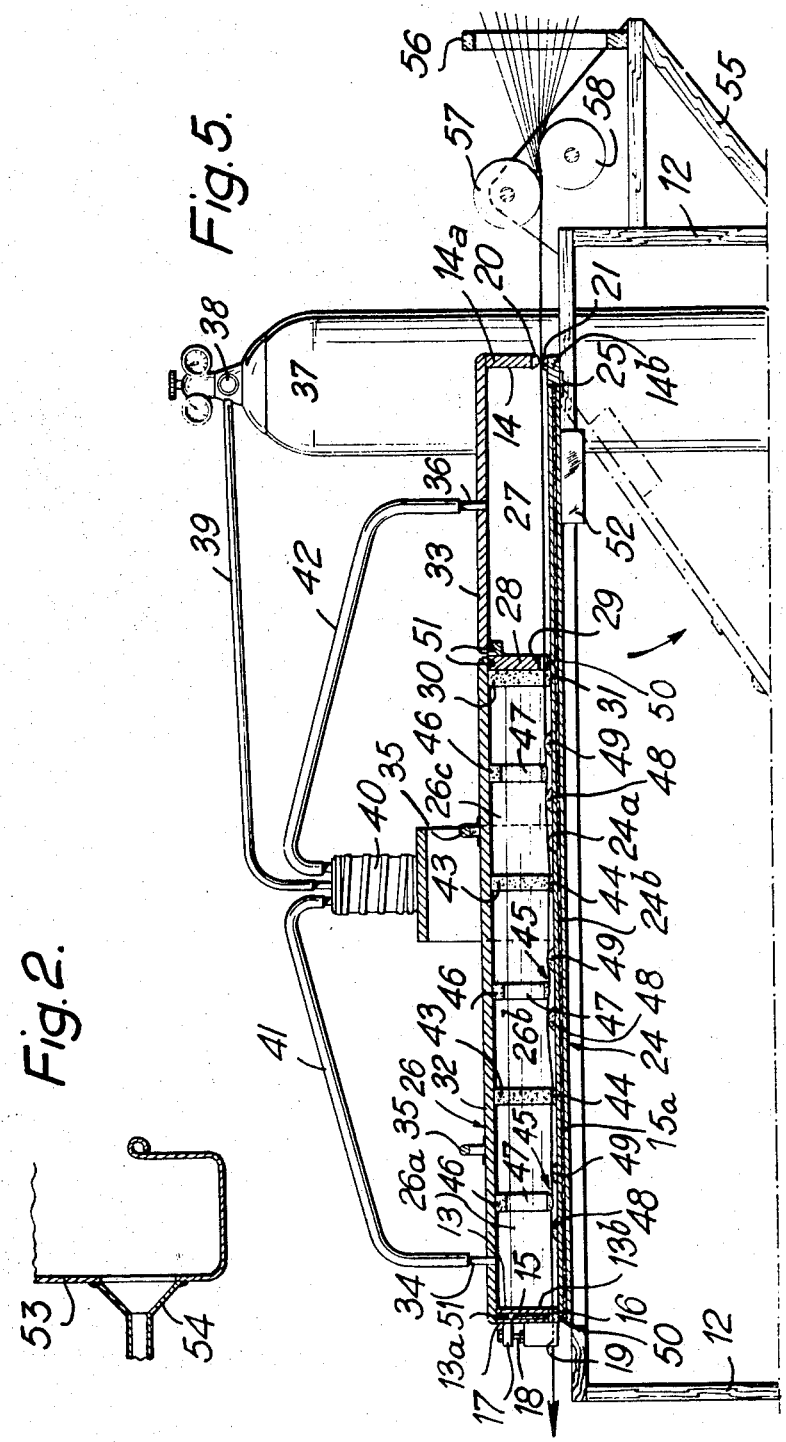

3,718,521
APPARATUS FOR IMPREGNATING YARNS, AND MORE PARTICULARLY GLASS YARNS, WITH SYNTHETIC RESINS
Andre Violleau, Vitrolles-le-Roucas, Rene Louis Coffy, Marseille, and Bernard Robert Laurent Marie Bancal, St.-Gratien, France, assignors to Societe Nationale Industrielle Aerospatiale, Paris, France
Filed July 24, 1970, Ser. No. 58,056
Claims priority, application France, July 29, 1969, 6925874
Int. Cl. B65h 75/00
U.S. Cl. 156—433                                  5 Claims

ABSTRACT OF THE DISCLOSURE

Impregnating apparatus is provided which includes a support for at least one spool of yarn to be impregnated, an impregnating unit formed by two chambers within a single enclosed space, a first chemical processing chamber and a second chamber for providing mechanical processing in conjunction with a dipping of the yarn or yarns into a resin bath, means for heating said chambers, and drawing and winding means.

---

This invention relates to the impregnation of yarn, and more particularly glass yarn, with synthetic resins.

The static and dynamic strength properties of a complex product—often referred to as a "laminated" product—obtained by impregnating yarn with synthetic plastics, depend not only on the intrinsic properties of its constituent parts but also in a large measure upon the intimacy of the bond therebetween, which in particular serves to balance the load between the constituent filaments of such yarns.

In the case of glass filament/synthetic resin bonds, the main flaws are due to the presence of air or water in the materials themselves and interposed therebetween. Since water inclusions are as a rule very small, efforts at improving quality are concerned primarily with eliminating the air bubbles.

Various machines have been proposed in order to accomplish this. Some of them include a first work position at which a catalyst is deposited on the textile fibres of the manufactured product and a second work position for forced-impregnation with a resin, these two work positions avoiding all risks of premature polymerization of the resins and eliminating air bubbles at the same time.

In other machines for providing bulk processing, a roll or spool of yarn is immersed in a tank containing resin and in which impregnation is carried out under a slight pressure, in the presence of a solvent, as a result of which a drying process is necessary in order to eliminate the latter.

In U.S. patent application Ser. No. 886,198 filed on Dec. 18, 1969, air bubbles liable to hinder obtaining of an intimate bond between the glass and the resin are eliminated by placing a piece of glass fibre fabric and carbon dioxide together in a chamber the transparency of which enables the subsequent impregnation process to be monitored visually. The present invention relates to yarn impregnating apparatus whereby it is possible to obtain maximum yarn strength characteristics and to accordingly improve the quality of laminated materials made therefrom and used in such working structures as helicopter blades, tanks and masts, and to improve the quality of wound structures obtained with such impregnated yarns.

An apparatus according to this invention includes a structure for supporting at least one spool of yarn to be impregnated, an impregnating unit and drawing and winding means.

The impregnating unit is characterized by the association of two debubbling means, to wit: chemically acting means consisting of a chamber in which an atmosphere of hot carbon dioxide is maintained, and mechanical means comprising for example a set of baffles disposed within an impregnation chamber preferably divided into three tight chambers, the glass yarns passing through said chambers and also (singly and substantially linearly in order to avoid breaking of the filaments) through the baffles dipping into a resin bath contained in the second chamber.

In a preferred embodiment, these two tight chambers are associated within a single vessel which includes lateral and longitudinal walls rigid with a support, a second-chamber cover carrying upper baffle-elements, a first-chamber cover, a removable bottom permitting rapid and easy cleaning and carrying lower baffle-elements, a heating system being incorporated in one of the lateral walls and in said bottom and enabling the impregnating resin to be maintained at a temperature corresponding to its optimum viscosity and the carbon dioxide to be maintained at the temperature which will insure an improved bond between the glass and the resin.

The subject apparatus of this invention further includes means for offering up a variable quantity of glass yarns for impregnation, which means comprise a structure for supporting spools of yarn, each spool being associated with a braking device which insures the same minimum tension in all the yarns and avoids accidental unwinding of the spools, notably when the drawing process is arrested.

Said apparatus further includes drawing means which causes the spools to unwind and the yarns therefrom to run through the impregnating apparatus, which drawing means further permit winding of the impregnated yarns the latter being conveyed as a calibrated assembly through a drawplate so as to form a ribbon of the required width.

The drawing and winding can be effected by means of a winch with two powered wheels that provide an S-shaped path and hich drive a winding spool through a friction coupling.

In an alternative embodiment, such drawing means may include a large-diameter driving wheel the rim of which bears a smooth coat of a material such as a silicone, and this rim is associated with a cooling system whereby the impregnating resin has a viscosity that improves adhesion between the layer of impregnated threads and a protective sheet, made of polyethylene for example, inserted between said layer and said wheel. The drive is accordingly provided by simple contact of the layer and the protective sheet with said driving wheel, without local kinking or crushing, thereby permitting satisfactory winding on large-diameter spools. Winding the impregnated layer on spools in this way results in minimum size for storage purposes.

The description which follows with reference to the accompanying non-limitative exemplary drawings will give a clear understanding of how the invention can be carried into practice.

In the drawings:

FIG. 1 shows an impregnation appparatus in side elevation;

FIG. 2 is a section taken through the line II—II of FIG. 1;

FIGURE 3 is a plan view of the impregnation unit proper, as shown in FIGURE 1;

FIGURE 5 shows on an enlarged scale, in longitudinal section, the impregnation unit of FIGURE 1;

Figure 7:
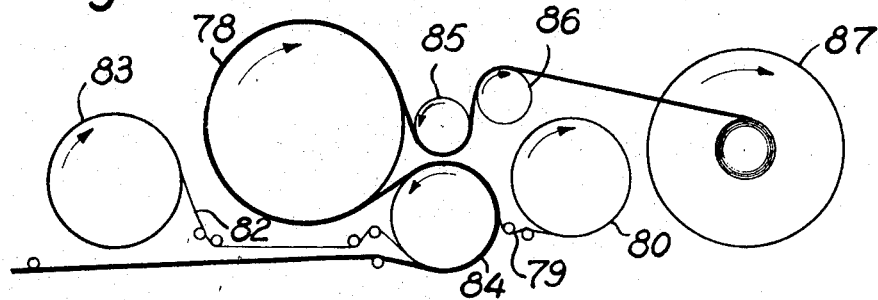
Figure 8:
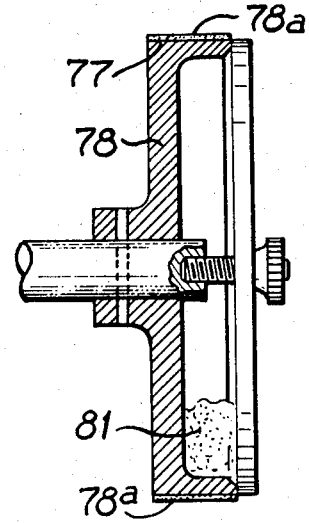

FIGURE 7 diagrammatically illustrates an alternative embodiment of drawing and winding means; and FIGURE 8 is a sectional view along a diametrical plane of the cooled driving wheel of the means depicted in FIGURE 7.

The apparatus shown in FIGURE 1 comprises a spool supporting structure 1, an impregnation unit 2 and a drawing and winding device 3.

Supporting structure 1 includes an easel-shaped frame 4 carrying a vertical plate 5 from which protrude stubs for supporting glass yarn spools 6 the number of which varies with the section of the laminated strip to be obtained by juxtaposition of the impregnated yarns. Each spool 6 is supported on a bushing freely rotatable on the corresponding stub 7. The stubs 7 are pivotally mounted horizontally in bearings 8 fixed to plate 5. Each spool is equipped with a brake for equalizing the tension in all the yarns during the unwinding process, such quality of tension being the result of equal braking on all the spools irrespective of the glass yarn winding diameters thereon. This braking effect can be obtained by means of a sheet 9 made of a material known by the trade name Teflon, resting on the uppersurface of the corresponding spool. One end of sheet 9 is wrapped and secured around a horizontal pin 10 fixed to plate 5, and the opposite end of said sheet is wrapped around and supports a counterweight 11 which causes the sheet to be applied uniformly over the periphery of the spool whereby to achieve the aforesaid appropriate braking effect. Alternatively, the spools could be mounted on ball-bearing.

When the yarn drawing process is stopped, it is necessary to restrain the spools in order to prevent them from unwinding the yarn accidentally and causing it to form knots. The brake 9 performs this function.

Figure 4:
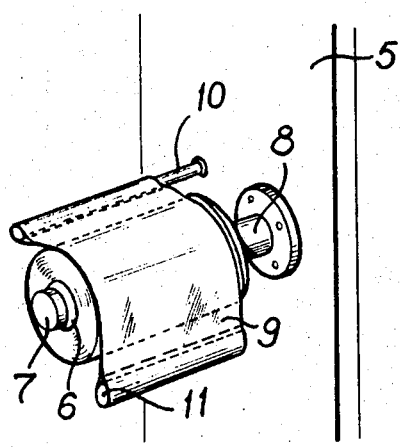
FIGURE 4 is a perspective detail view of a pay-out spool and its associated brake.
Figure 6:
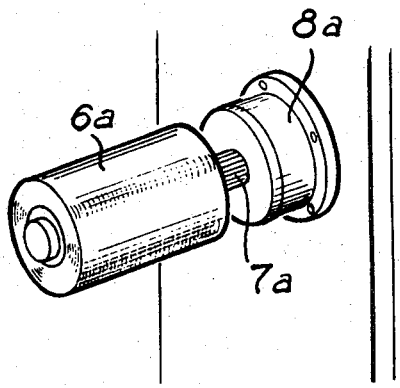
FIGURE 6 illustrates an alternative embodiment of a spool holder and brake.

As shown in FIG. 6, it is alternatively possible to associate with the stub 7a of a spool 6a a bearing 8a containing an electromagnetic brake of known type that is controlled directly by the drawing device 3, whereby the latter releases the brake to the required extent when drawing is to begin and renders it more effective when drawing ceases.

The impregnation unit 2 is mounted on a bed 12 supporting an indented table 12a the inside surfaces of the sides of which support flanges 13 and 14 forming the end walls of the impregnation chamber (see FIG. 3). As is more clearly shown in FIG. 5, the flange 13 is in turn formed of two walls 13a and 13b which are separated by spacers and form therebetween a space containing electric heating resistances 15. At the bottom of these two walls is an opening 16. Fixed to the outside of outer wall 13a is an adjustable drawplate 17 having a jaw which can be moved vertically by a screw 18. Drawplate 17 is formed at its bottom with a hole 19 in registry with the opening 16 in flange 13.

The opposite flange 14 is formed by a vertical wall 14a secured to table 12a by angle-irons (not shown) and supporting on its lower edge a pressing strip 20 made of lined elastic material and more specifically of Teflon-covered rubber. Strip 20 is in contact with a facing companion strip 21 made of the same material and supported on a cross-member 14b fixed to table 12.

Longitudinal walls 22 and 23, more clearly visible in FIG. 3, are mounted on either side of flanges 13 and 14.

The lower part of the frame formed by the flanges and the longitudinal walls is covered by a removable bottom 24, possibly pivotally mounted about a hinge 25 fixed to cross-member 14b, and this bottom comprises two partition walls 24a and 24b. Between these two suitably cross-braced partition walls are provided electric resistances 15a. The opposite end of bottom 24 is leaktightly fastened beneath flanges 13, and bottom 24 is furthermore leaktightly applied against cross-member 14a and beneath the lower edges of longitudinal walls 22 and 23.

The enclosed space formed thus is divided into two chambers, to wit a chamber 26 for receiving a bath of synthetic resin and a chamber 27 for containing a carbon dioxide atmosphere, which chambers are segregated from each other by a partition wall 28, which wall has its edges fixed to walls 22 and 23 and is formed with a passageway hole 29 at its base. Leaktightness between these chambers is provided by a partition wall formed of two sections 30 and 31 made of plastic and performing the function of a resin trap. Upper section 30 is removable and is slidably mounted in substantially vertical slideways fixed to walls 22 and 23, and lower section 31 is fixed to the inside face of bottom 24.

Two covers 32 and 33 made of transparent material respectively cover the resin-bath chamber 26 and the carbon dioxide atmosphere bath 27, said covers being restrained on these chambers by quick-release fasteners. The cover 32 carries an external connection stub 34 for the supply of carbon dioxide and two handles 35. Cover 33 is fitted with a carbon dioxide supply connection 36.

The carbon dioxide is fed via a circuit connected to a carbon dioxide bottle 37 fitted with a release and pressure adjusting valve 38 which is connected through a tube 39 to a heat exchanger 40 comprising a gas circulating coil and electric heating resistances whereby to raise the gas to the required temperature. hereafter the gas is conveyed into chambers 26 and 27 through preferably flexible pipes 41 and 42 extending up to connection stubs 34 and 36.

Resin-bath-containing chamber 26 is divided into three compartments 26a, 26b and 26c which are leaktightly separated from one another by imperforate baffle-forming vertical partition walls or wall members 43 and 44 made of plastic. Each partition wall includes an upper end 43 fixed to the inside face of cover 32 and a lower end 44 fixed to the inside face of bottom 24. Each compartment comprises in its middle a unit 45 formed by a pendant or wall member 46 which embodies an opening 47 over most of its expanse and is fixed to the inside face of cover 32. On either side of the lower end of member 46 are two ridges 48 and 49 fixed to the inside face of bottom 24. Each system constituted by a pendant member 46 and the two ridges 48 and 49, made of plastic, form a baffle along the path of the yarns.

Leaktightness between chambers 26, 27 and bottom 24 is provided by seals 50 and by means of seals 51 between the upper chamber edges and covers 32 and 33.

A thermostat 52 positioned beneath bottom 24 allows the temperature which is to be imparted to the resin bath to be set and maintained in order that the resin should have the optimum viscosity required for satisfactory impregnation, the adjustment being obtained by acting upon the power supply to electric resistances 15 and 15a.

At the base of bed 12 is a tank 53 (FIGS. 1 and 2) of right-angled trapezoidal section with unequal sides, the higher of which sides carries a stub 54 for connection to a fan sucking out the vapours of a solvent used during cleaning operations, which tank receives the bottom 24 when the same swings open upon opening of the chambers.

At its upstream end (with respect to the direction of travel of the yarn), bed 12 includes a console 55 which carries a yarn-guiding rake 56 formed by a plastic grid (preferably made of superpolyamide), whereby to prevent the yarns from crossing and rubbing against one another as they unwind from spools 6. Console 55 further supports the axle bearings of two offset rolls 57 and 58 made of a similar material and positioned between rake 56 and the entrance to chamber 27, the function of these rolls being to lay the yarns horizontally before the layer thereof enters chamber 57.

Regardless of the configuration of the glass yarn surface preparation and impregnation station, the subject apparatus of this invention includes a drawing and winding device 3 which, as shown in FIG. 1, includes a supporting structure 59 carrying two driving wheels 60 and 61 that form a capstan and are driven by a motor-reduction gear unit (not shown).

Likewise disposed at this station are two spools 62 and 63 from which unroll protective strips, made of polyethylene for example, which are so arranged as to be interposed between wheels 60 and 61 and the layer of impregnated glass yarns then forming a ribbon, whereby to protect the two sides of this ribbon.

The ribbon protected thus on both sides is pulled out of the capstan and wound on to a take-up spool 64 which is positively rotated by a friction-drive, preferably of the spring type, off one of the capstan shafts. This system allows the spool to slip in relation to its driving member in order that its peripheral velocity may be equal to the ribbon input rate, and this with a tension sufficient to ensure that the ribbon and its protective strips are correctly wound on to said spool.

In the alternative embodiment shown in FIGS. 7 and 8, the strong adhesiveness of the impregnating resin alone is used for the drawing process. This alternative arrangement accordingly includes a driving wheel 78 having a plastic rim 77, proximate to which are positioned intermediate wrapping pulleys 84 and 85 which ensure a maximum wrapping arc around wheel 78. A projective sheet 79 is fed from a spool 80 on to the ribbon of laminated yarns, between the ribbon and the silicone-coated rim 78a of wheel 78. Similarly, a further protective strip 82 unwound from a spool 83 is inserted between the ribbon and the rim of take-up pulley 84. This avoids possible disuniting of the yarns forming the ribbon when the latter is about to come into contact with a pulley or about to leave a rim thereof.

The ribbon is driven along by meeting the dual requirement of friction-drive of protective strips 79 by the rim 78a of pulley 78 and friction-drive of said strip 79 with respect to the ribbon itself. Adhesion between strip 79 and wheel 78 is due to the smooth silicone lining 78a, to the large diameter of wheel 78 and to the amplitude of the wrapping arc thereabout, having regard for the thickness of strip 79.

Adhesion between strip 9 and the ribbon is always naturally sufficient because of the viscosity of the resin, and the latter can accordingly be improved by a cooling effect which can be applied to wheel 78, notably by piling Dry Ice 81 into the hollow part of the wheel, such Dry Ice readily being obtained from a bottle such as bottle 37. It is feasible in this way to maintain a rim temperature of 1° C. to 4° C. Obviously, any other convenient cooling means may be used, for instance by surrounding the entire drawing device with an envelope and causing a suitably conditioned atmosphere to prevail therein.

Preferably, the wheel 84 performs the function of shaping the ribbon by means of a groove formed in the rim of wheel 84 whereby to form sloping lateral flanges thereon between which the ribbon runs and can reach the required width.

An additional intermediate loose pulley 86 enables take-up pulleys 84 and 85 to be brought as close as possible and allows the ribbon to avoid the protective strip delivering spool 80 and to be conveyed to spool 87, which is identical to spool 64 hereinbefore described and is driven in like fashion.

The manner of operation of the arrangement described hereinabove is self evident and requires no detailed explanation.

The glass yarns drawn from spools 6 pass through the alignment members (rake 56, rolls 57 and 58) and arrive spread out as a wide layer into the chamber for contact with the hot carbon dioxide which is at slight overpressure by virtue of the flow rate imposed by valve 38 on bottle 37 or of an interposed flow meter, not shown in FIG. 7. As it draws together, this layer next passes through impregnation chamber 26 where debubbling is effected either by the baffles, the friction thereon and the changes of direction which the same impose further facilitating impregnation of the yarn by the resin.

The glass yarns form a layer which remains spread out during its transit through the processing chambers, whereby each yarn is individually processed notwithstanding a certain degree of convergence toward the exit end. They are then gathered together and calibrated as a whole, thereby imparting to the ribbon obtained the desired proportion of resin with respect to the quantity of glass, by means of adjustable drawplate 17 or like means.

The polythene strips protect the ribbon during the drawing operation and also while the spools are stored before use.

The above-disclosed arrangement is simple and efficient, and the end-product exhibits maximum strength characteristics in actual use.

It goes without saying that many changes and substitutes of parts may be made in the specific embodiments hereinbefore described, without departing from the scope of the invention. Of course, it will be understood that, in its broader aspects, this invention is not limited to glass yarns alone but that it includes in its scope other materials such as carbon, boron and like materials from which filaments can be drawn.

What we claim is:

1. In an apparatus for impregnating with synthetic resin, yarns formed by twisted or non-twisted filaments of materials from a class including at least glass, boron and carbon by dip impregnation preceded by a surface preparation of said yarn and comprising: a supporting structure for at least one spool of yarn to be impregnated; an impregnation unit for receiving yarn from said spool and through which said yarn is passed; means for drawing and winding impregnated yarn; said impregnation unit comprising a first chamber forming a physico-chemically operating means and having therein an active medium traversed by said yarn and a second chamber forming a second debubbling means including a bath of impregnating material, and mechanically operative means for conveying said yarn through said bath in a path having predetermined changes in direction; the improvement wherein said first and second chambers constitute a single vessel including, in combination, lateral and longitudinal walls rigid with said supporting structure, a cover for said second chamber, said cover including upper elements for baffles which upon closure of said cover are positioned along the path followed by said yarn, a cover for said first chamber and a common removable bottom for said chambers, which includes at the bottom of said second chamber, lower elements for said baffles, said upper and lower elements cooperatively constituting said baffles, one of said lateral walls and said bottom including heating means, said improvements further comprising a source of gaseous carbon dioxide which constitutes said active medium, said active medium being heated, and wherein said covers comprise connecting means connected to said source of gaseous carbon dioxide.

2. An apparatus as claimed in claim 1 wherein said lateral and longitudinal walls include edges, said apparatus further comprising seals, and wherein said covers and bottom are tightly applied on the edges of said lateral and longitudinal walls through said seals which are situated at said edges.

3. An apparatus as claimed in claim 1 in which at least one of said upper baffle elements includes wall member provided with an aperture, said one upper baffle element including a lower edge being situated between and spaced from upper edges included by two neighboring of said lower baffle elements.

4. An apparatus as claimed in claim 3 in which at least one of said upper baffle elements is an imperforate wall member including a lower edge which faces an upper edge included by a corresponding one of said lower baffle elements, the baffle elements with the facing edges separating said second chamber into distinct bath containing compartments.

5. An apparatus as claimed in claim 4 wherein said imperforate wall element and the upper baffle element provided with said aperture alternate within said second chamber.

References Cited

UNITED STATES PATENTS

| | | | |
|---|---|---|---|
| 3,471,322 | 10/1969 | Medney | 118—405 |
| 3,473,513 | 10/1969 | Paul, Jr. | 118—405 |
| 3,449,152 | 6/1969 | Detrick | 117—54 |
| 1,714,848 | 5/1929 | Castricum | 156—436 |
| 2,795,207 | 6/1957 | Marco | 118—405 X |
| 3,144,355 | 8/1964 | Raskin | 118—67 X |
| 3,384,505 | 5/1968 | Palmer et al. | 117—61 X |
| 1,887,005 | 11/1932 | Apple | 117—67 X |

BENJAMIN A. BORCHELT, Primary Examiner

H. J. TUDOR, Assistant Examiner

U.S. Cl. X.R.

118—65, 404